United States Patent [19]

Takara et al.

[11] Patent Number: 4,969,797
[45] Date of Patent: Nov. 13, 1990

[54] FAN MOTOR

[75] Inventors: Akira Takara, Kadoma; Teruo Maruyama, Hirakata, both of Japan

[73] Assignee: Matsushita Electric Industrial Co., Ltd., Osaka, Japan

[21] Appl. No.: 327,116

[22] Filed: Mar. 22, 1989

[51] Int. Cl.$^5$ .................. F01D 3/02; F16C 32/06
[52] U.S. Cl. .................. 415/113; 415/96; 415/107; 415/171.1; 417/423.13; 384/106; 384/115
[58] Field of Search ............... 415/96, 97, 104, 105, 415/106, 107, 171.1; 417/423.12, 423.13; 384/106, 119, 315, 398

[56] References Cited

U.S. PATENT DOCUMENTS

| | | | |
|---|---|---|---|
| 3,960,468 | 6/1976 | Boorse et al. | 417/423.13 |
| 4,415,281 | 11/1983 | Agrawal | 384/106 |
| 4,502,795 | 3/1985 | Klaass et al. | 384/106 |
| 4,596,474 | 6/1986 | Van Roemburg | 384/115 |
| 4,820,950 | 4/1989 | Hijiya et al. | 384/115 |

FOREIGN PATENT DOCUMENTS

| | | | |
|---|---|---|---|
| 1525193 | 9/1969 | Fed. Rep. of Germany | 384/398 |
| 2737685 | 3/1978 | Fed. Rep. of Germany | 384/398 |
| 2747399 | 4/1979 | Fed. Rep. of Germany | 384/119 |
| D217590 | 1/1985 | German Democratic Rep. | 384/315 |

Primary Examiner—Edward K. Look
Assistant Examiner—Hoang Nguyen
Attorney, Agent, or Firm—Wenderoth, Lind & Ponack

[57] ABSTRACT

A rotor shaft provided with a fan is rotatably supported by pneumatic bearings for the purpose of high speed rotation with low noise. The rotor shaft provided with the fan can also be supported at one end by a resilient bearing so as to provide high speed rotation even if the concentricity of the bearings is low.

5 Claims, 4 Drawing Sheets

FAN MOTOR

BACKGROUND OF THE INVENTION

1. Industrial Field of Utilization.

The present invention relates to a fan motor adapted for high speed rotation.

2. Prior Art

For use with a common electric cleaner, there has been provided a fan motor having a rotor shaft rotatably mounted at both end on ball bearings and adapted to have a fan at the one end thereof.

As shown in FIG. 7, the arrangement of such a prior art fan motor 40 indicates a stator 41, a rotor 42, a brush 43, and a commutator 44. The rotor 42 and the commutator 44 are fixedly mounted on the intermediate portion of a rotor shaft 45 which has a fan 46 at one end. The rotor shaft 45 is movably supported by the first ball bearing 47 interposed between the rotor 42 and the fan 46 and the second ball bearing 48 disposed at the other end. The numeral 49 represents an air intake opening and the numeral 50 represents a diffuser.

For movement, the rotor 42 rotates at a high speed when energized from the brush 43 via the commutator 44 and thus, actuates the fan 46 mounted to the end of the rotor shaft 45 so that the air is drawn through the air intake opening 49 and then, exhausted via the diffuser 50.

If the rotation of the motor, which is 20,000 to 30,000 rpm in a conventional electric cleaner, is increased to 50,000 to 60,000 rpm for in order to reduce the size of the device, the problem will arise that there is increased noise and vibration produced by contact between the brush 43 and the commutator 44 and also, from the ball bearings 47 and 48 supporting the rotor shaft 45. The life of such components will thereby be shortened. This may result in a considerable loss of torque and a decline in efficiency.

Although, noise and vibration caused between the brush 43 and the commutator 44, can be solved by using a brushless motor, the noise and vibration caused by ball bearings 47, 48 will remain. Thus, the life of the rotor shaft will be short and the torque loss will be inevitable.

SUMMARY OF THE INVENTION

The present invention, therefore, has as its principal object the provision of a fan motor adapted for high speed rotation with low noise, efficiency and long life and with can be made compact in size.

It is another object of the present invention to provide a fan motor adapted for high speed rotation even if the accuracy of axial concentricity is low.

These and others objects are accomplished by a fan motor which comprises a rotor shaft, having a fan fixedly mounted thereto, and supportedly mounted on a hydrodynamic thrust air bearing which generates a thrust load to resist against the thrust load caused by rotation of the fan and also, a hydrodynamic air bearing for rotation. The rotor shaft of the fan motor is flexibly supported at the fan mounting end thereof.

This invention provides low noise and high efficiency during high speed rotation of the motor. As the rotor shaft is flexibly supported at one end, it can constantly rotate at a high speed even if the axial concentricity is low.

DETAILED DESCRIPTION OF THE INVENTION

First embodiment

Figure 1:
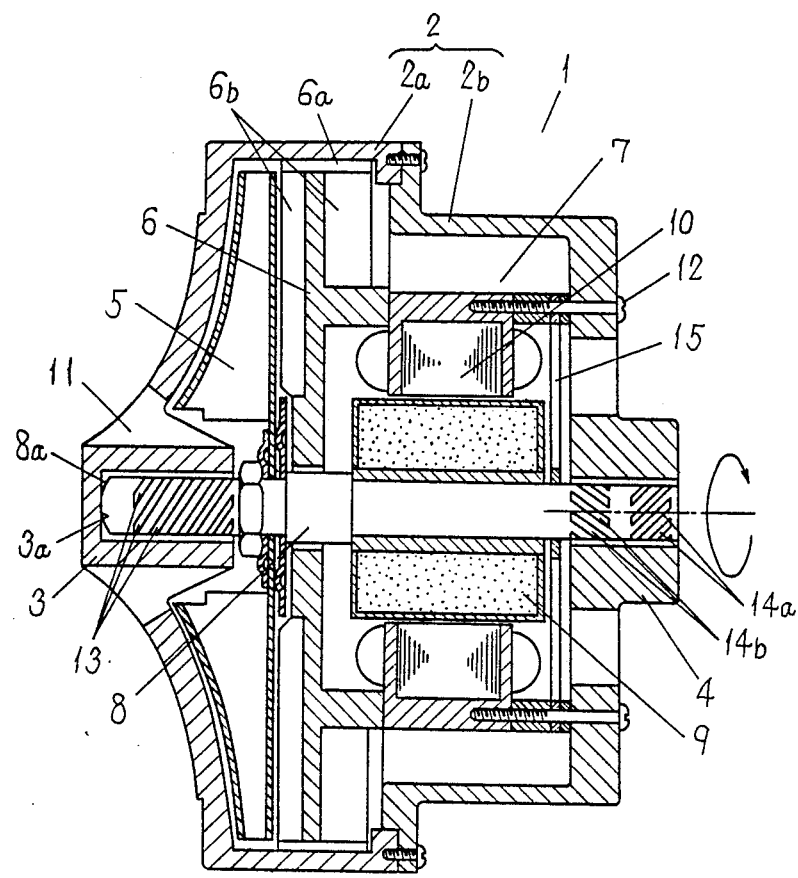
FIG. 1 is a cross sectional view of a fan motor in the form of the first embodiment of the present invention.

The first embodiment of the present invention will be described with reference to FIG. 1.

The numeral 1 represents a fan motor installed in an electric cleaner (not shown), in which the front air intake opening 11 is connected at front to a dust collecting filter (not shown) and further communicated with a suction opening (not shown) via a suction hose (not shown).

There is provided a casing 2 which is separated into a front casing 2a and a rear casing 2b. The front casing 2a contains the first bearing 3 provided in the front axial center thereof and formed into a bottom-closed cylindrical shape having a closed end at the front. The air intake opening 11 is arranged so as to surround the first bearing 3. The rear casing 2b contains the second bearing 4 of cylindrical shape provided in the rear axial center thereof. The front casing 2a also accommodates a fan 5 and a diffuser 6 while the rear casing 2b accommodates a brushless motor 7.

The numeral 8 represents a rotor shaft rotatably supported at one end by the first bearing 3 and at the other end by the second bearing 4. The rotor shaft 8 is provided at a front end with the fan 5 and at a rear end with a rotor 9 of the brushless motor 7. On the circumferential periphery of the rotor 9, there is provided a stator 10 which is properly spaced from the rotor 9 and fixedly mounted by retainer bolts 12 to the rear casing 2b. The diffuser 6 is fitted into the front casing 2a so as to be located behind the fan 5. Also, a narrow passage is provided between the circumference of the diffuser 6 and the inner wall of the front casing 2a. The diffuser 6 has a plurality of guide fins 6a and ribs 6b.

The rotor shaft 8 has a plurality of spiral grooves 13 formed in the front end thereof which is fitted into the first bearing 3. The spiral grooves 13 are arranged in shape so that the lubricant air between the first bearing 3 and the rotor shaft 8 can be moved under pressure towards the forwardmost end 3a of the first bearing 3 when the rotor shaft 8 rotates. This arrangement constitutes an air bearing for providing a thrust load to resist against the thrust load caused by the fan 5. The other end 8a of the rotor shaft 8 is formed in as a portion of a sphere arrangement so as to come in point contact with the radial center of the forwardmost end 3a of the first bearing 3. For the purpose of urging the rotor shaft 8 to accomplish the point contact in the beginning of rotating movement after the brushless motor 7 is energized, the rotor 9 and the stator 10 are arranged radially eccentrically.

The rotor shaft 8 has a pair of spiral grooves 14a and 14b formed in the other end thereof which is fitted into the second bearing 4. The spiral grooves 14a and 14b, each of which consists of a plurality of recesses, are arranged in so-called herringbone form so that the lubricant air between the rotor shaft 8 and the second bearing 4 can be moved under pressure to the area between the spiral grooves 14a and 14b as the rotor shaft 8 rotates, thus constituting a radial air bearing.

There is also provided a position detector plate 15 for detecting the rotational position of the brushless motor 7 and controlling the energization thereof.

The operation in the arrangement will now be described. When the stator 10 of the brushless motor 7 is energized, the rotor 9, rotor shaft 8, and fan 5 start rotating. Simultaneously, the rotor shaft 8 is urged forward due to the radial eccentricity of the rotor 9 and stator 10 and thus, the front end 8a comes into contact with the forwardmost end 3a of the first bearing 3 for positioning. Then, as the rotating speed increases, the lubricant air in the first bearing 3 is yieldingly moved towards the forward end of the first bearing 3 by pumping action of the spiral grooves 13 and becomes increased in pressure. As a result, the air bearing action is radially effected due to a wedge-like movement of the lubricant air between the inner wall of the first bearing 3 and the periphery of the rotor shaft 8. Also, a backward thrust load is on the rotor shaft 8 by the pressure on the front end 8a of the rotor shaft 8. The backward thrust load offsets a forward thrust load exerted on the rotor shaft 8 by rotation of the fan 5.

Similarly, the lubricant air in the second bearing 4 is yieldingly moved towards the area between the paired spiral grooves 14a and 14b by pumping action of the same and becomes increased in pressure. As a result, the air bearing action is radially effected due to a wedge-like movement of the lubricant air between the inner wall of the second bearing 4 and the periphery of the rotor shaft 8. Accordingly, the rotor shaft 8 is rotatably supported in non-contact relationship at both ends by the air bearings, and thus, can rotate at 50,000 to 60,000 rpm without creating noise and vibration. In this manner, the life of the fan motor is improved and the torque loss is reduced.

The air drawn through the air intake opening 11 by rotation of the fan 5 flows under pressure in radial directions of the fan 5 due to a centrifugal force on the fan 5 and passes through the narrow passage extending along the periphery of the diffuser 6 as directed by the guide fins 6a. Then, the air moves in various directions after the diffuser 6 and through the peripheral space about the stator 10 before being discharged from the rear end of the rear casing 2b.

Although this embodiment employs a spiral thread arrangement to create the air bearing, another air bearing can be used such as a static air pressure bearing utilizing a pressure produced by pressure generator means separately provided on the rotor shaft.

According to the first embodiment, the rotor shaft is rotatably supported by the air bearings and thus, can rotate at a high speed without creating an excessive noise or vibration, whereby the life of each bearing will be improved. Also, air which is low in viscosity is used as a lubricant fluid, whereby the torque loss during high speed rotation will be minimized and high efficiency will be achieved. The thrust load caused by rotation of the fan can be offset with the hydrodynamic thrust air bearings.

Additionally, two air bearings are provided. The first air (or pneumatic) bearing is constituted by the bottom-closed cylindrical first bearing and one end of the rotor shaft having spiral grooves. The second air (or pneumatic) bearing is constituted by the cylindrical second bearing and the other end of the rotor shaft having one or plural pairs of spiral grooves. Thus, the rotor can be rotatably supported in such a simple arrangement without the use of external air supply and simultaneously, the thrust will be offset.

With this high-speed fan motor installed for use, an electric cleaner can be made compact in size, will create less noise and will provide high efficiency operation.

Second embodiment

A second embodiment of the present invention in the form of a fan motor will be described in reference to FIGS. 2 through 5. This embodiment is distinguished from the first embodiment in that it includes resilient supports for the rotor shaft.

Figure 2:
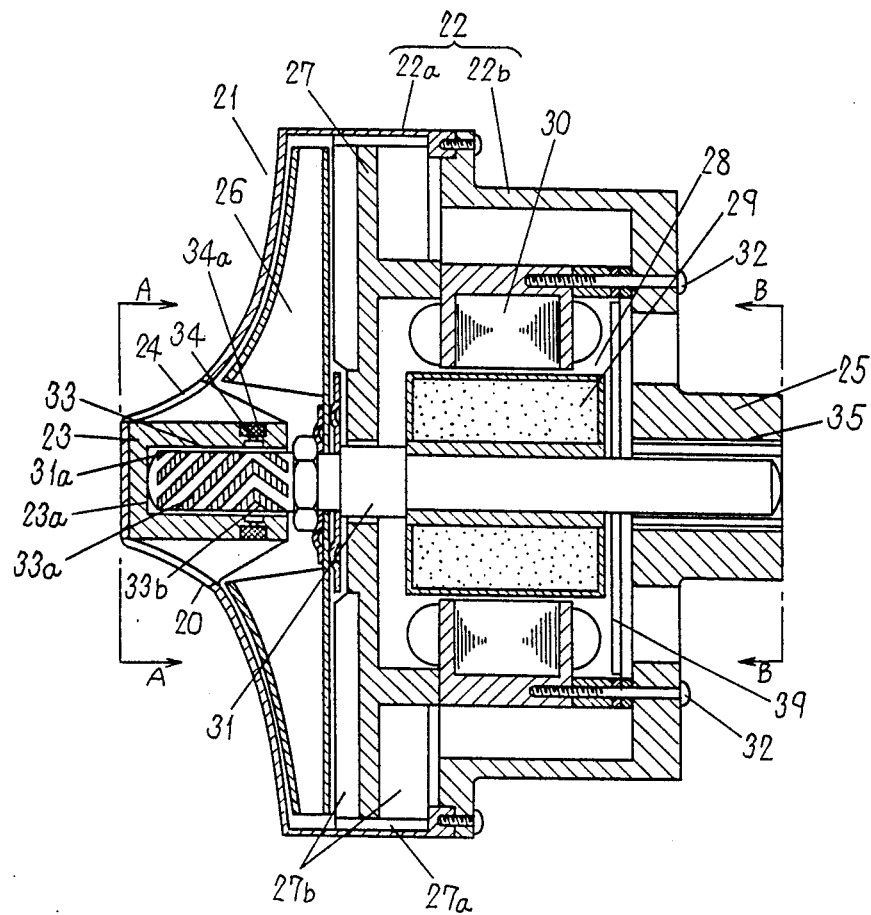
FIG. 2 is a cross sectional view of a fan motor in the form of the second embodiment of the present invention.
Figure 3:
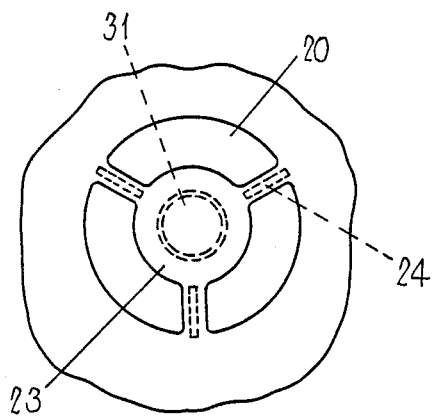
FIG. 3 is a view taken along the line A—A of FIG. 2.

As shown in FIG. 2, the numeral 21 represents a fan motor installed in an electric cleaner (not shown), in which the front air intake opening 20 is connected at front to a dust collecting filter (not shown) and further communicated with a suction opening (not shown) via a suction hose (not shown).

There is provided a casing 22 which is separated into a front casing 22a and a rear casing 22b. The front casing 22a contains a bearing 23 provided in the front radial center thereof and formed into a cylindrical shape having a closed end at the front. The bearing 23 is flexibly supported by a plurality of radially arranged resilient supporters 24 so that it can move about a point on its axis in all directions. The air intaking opening 20 is constituted by inner spaces between the resilient supporters 24. The rear casing 22b contains a bearing tube 25 of cylindrical shape provided in the rear radial center thereof. The front casing 22a also accommodates a fan 26 and a diffuser 27 while the rear casing 22b accommodates a brushless motor 28.

The brushless motor 28 comprises a rotor 29 and a stator 30 is provided on the circumferential periphery of the rotor 29 and properly spaced from the same. The rotor 29 is fixed with the rear of a rotor shaft 31 while the stator 30 is fixedly mounted by retainer bolts 32 to the rear casing 22b.

The fan 26 is fixedly mounted to the front of the rotor shaft 31. The diffuser 27 is fitted into the front casing 22a so as to be behind the fan 26. Also, a narrow passage is provided between the circumference of the diffuser 27 and the inner wall of the front casing 22a. The diffuser 27 has a plurality of guide fins 27a and ribs 27b.

The rotor shaft 31 has a pair of spiral grooves 33a and 33b formed in the front end thereof in so-called herringbone arrangement, each of which is constituted by a plurality of spiral recesses, and is movably fitted in the bearing 23 with a proper clearance. The bearing 23 has air holes 34 formed therein for supplying external air to the border area between the spiral grooves 33a and 33b. Each of the air hole 34 is provided at an outer end thereof with a filter 34a for removal of dust. The spiral grooves 33a in the front are arranged in shape so that the lubricant air between the bearing 23 and the rotor shaft 31 can be moved under pressure towards the forwardmost end 23a of the bearing 23 when the rotor shaft 31 rotates. This arrangement constitutes a hydrodynamic air bearing 33 for providing a thrust load to resist against the thrust load caused by the fan 26. The rear spiral grooves 33b are arranged to direct the flow of air towards the opening end of the bearing 23 in order to prevent dust from entering the bearing 23. The front end 31a of the rotor shaft 31 is also formed as a portion of a sphere so as to come in point contact with the radial center of the innermost end 23a of the bearing 23. For the purpose of urging the rotor shaft 31 forward to accomplish the point contact during initial rotational movement after the brushless motor 28 is energized, the rotor 29 and the stator 30 are mounted in a radially eccentric arrangement.

Figure 4:
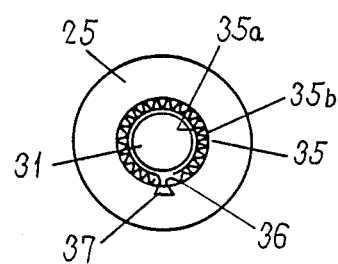
FIG. 4 is a view taken along the line B—B of FIG. 2.
Figure 5:
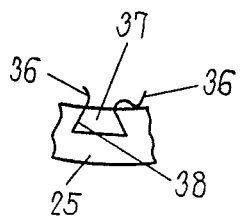
FIG. 5 is a partially enlarged view of FIG. 4.

The rotor shaft 31 is fitted at the other end in a resilient foil bearing 35 provided on the inner wall of the bearing tube 25. The resilient bearing 35 may be of various types so long as it provides flexible support for said shaft. FIG. 2 shows an arrangement having such a foil bearing as described in the June 1979 issue of "Machine Design". This type of resilient bearing 35 has a bearing surface 35a formed with a foil of thin layer 36 such as a metal foil or a plastic film, having a small distortion resistance, as shown in FIG. 4. The foil 36 is arranged in a wave form so as to constitute a cushion 35b between the bearing surface 35a and the inner wall of the bearing tube 25. As best shown in FIG. 5, there is also provided a retainer key 37 which is adapted for retaining the foil 36 in position and is inserted into a dove-tail slot formed in the inner wall of the bearing tube 25.

There is also provided a position detector plate 39 for detecting the rotational position the brushless motor 28 and controlling the energization thereof.

The operation of this arrangement will now be described. When the stator 30 of the brushless motor 28 is energized, the rotor 29 and rotor shaft 31 start rotating. Simultaneously, the rotor shaft 31 is urged forward due to the radial eccentricity of the rotor 29 and stator 30 and thus, the front side end 31a comes into contact with the forward end 23a of the bearing 23 for positioning.

Then, as the rotation speed increases, the lubricant air in the hydrodynamic air bearing 33 is yieldingly moved towards the forward end of the bearing 23 by pumping action of the spiral grooves 33a and becomes increased in pressure. As a result, the radial load can be sustained by means of wedge-like movement of the lubricant air between the inner wall of the bearing 23 and the periphery of the rotor shaft 31 and also, a backward thrust load is exerted on the rotor shaft 31 by the pressure on the front end 31a of the rotor shaft 31. The backward thrust load offsets a forward thrust load exerted against the rotor shaft 31 by rotation of the fan 26.

On the other hand, the rear end of the rotor shaft 31 is spaced from the fan 26, such that therefore no radial load will be involved as the rotor shaft 31 is supported at its rear end by the foil bearing 35. The foil bearing 35 which support the rotor shaft 31 during high-speed rotation, can compensate a radial deviation of the rotor shaft 31 from the coaxis of the hydrodynamic air bearing 33.

The bearing 23 is flexibly supported by the resilient supporters 24 for radial movement, so that it can easily respond to an inclination of the rotary shaft 31. Accordingly, the rotary shaft 31 remains consistently supported during the rotation even if its concentricity is low.

The rotor shaft 31 is supported at both ends by the hydrodynamic air bearing 33 and the resilient bearing 35 in non-contact and self-alignment relationship and thus, can rotate at 50,000 to 60,000 rpm without creating noise and vibration, whereby the life of the fan motor will be improved and the torque loss will be minimized.

The air drawn through the air intake opening 20 by rotation of the fan 26 flows under pressure in radial directions of the fan 26 due to a centrifugal force of the fan 26 and passes through the narrow passage extending along the periphery of the diffuser 27 as directed by the guide fins 27a. Then, the air moves in various directions after the diffuser 27 and through the peripheral area of the stator 30 before being discharged from the rear end of the rear casing 22b.

Figure 6:
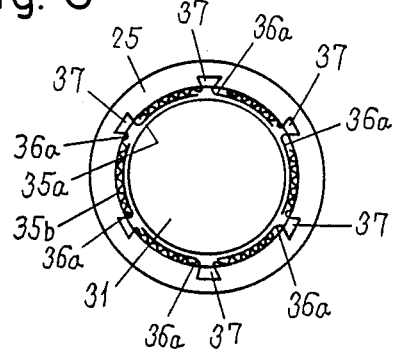
FIG. 6 is a view showing another arrangement of foil bearings.
Figure 7:
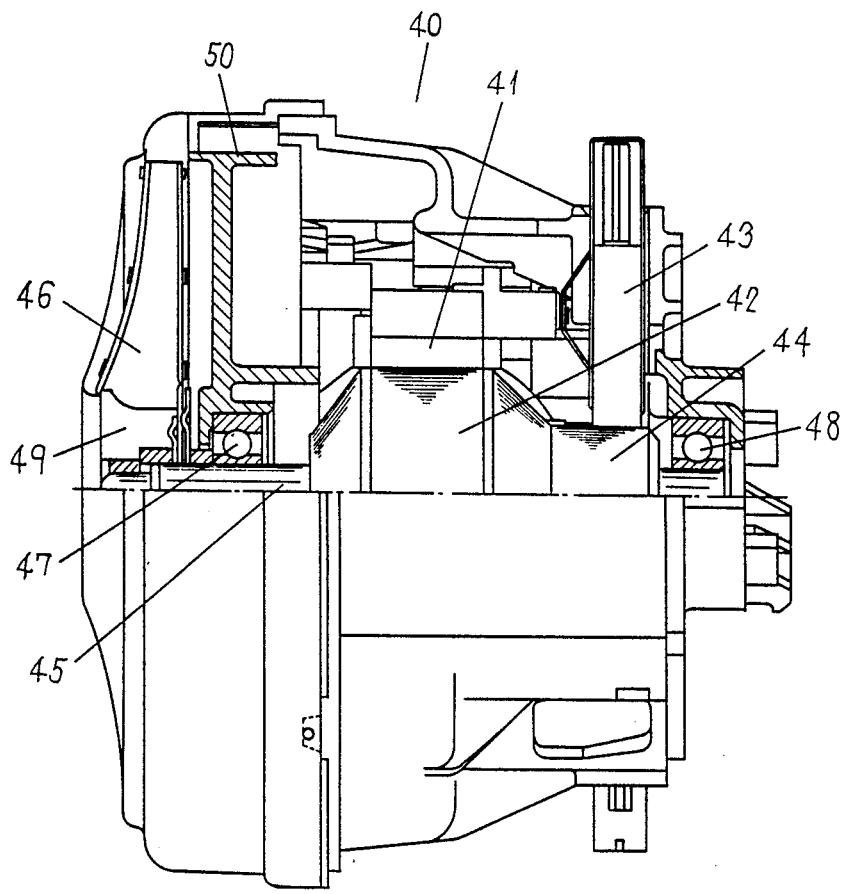
FIG. 7 is a cross sectional view of a prior art fan motor.

Although the resilient bearing 35 in this embodiment incorporates the bearing surface 35a and the cushion 35b constituted by the foil 36 extending in an annular manner, it may be provided having a plurality of bearing surfaces 35a and cushions 35b arranged along the circumference thereof with the use of separate foils 36a, as shown in FIG. 6. Also, various resilient bearings, e.g. an elastomer bearing, may be used with equal success.

According to the second embodiment, an eccentricity resulting from poor concentricity of the rotary shaft can be compensated by the resilient bearings. In cooperation with the effect of the first embodiment, this provides the machining and assembly operations to be facilitated Thus, a rotary device capable of high speed running can be fabricated with ease.

Additionally, an inclination of the rotary shaft can be offset by means of a flexible support for the pneumatic bearing.

Furthermore, the hydrodynamic air bearing is constituted by the cylindrical bearing and the spiral grooves formed in the rotor shaft for forcing air towards the innermost end of the bearing, so that it can bear a thrust load and thus, will advantageously be adopted for use with a high-speed rotary device such as a fan motor which generates a thrust load.

What is claimed is:

1. A fan motor, having a forward end and a rearward end, comprising:
    a rotor shaft having a fan fixedly mounted thereto for rotation therewith;
    means, including a hydrodynamic radial air bearing and a hydrodynamic thrust air bearing, for flexibly supporting said rotor shaft and for generating a thrust load to oppose a load caused by said fan upon rotation thereof, a forward end of said rotor shaft being rotatably mounted in said thrust air bearing and a rearward end of said rotor shaft being rotatably mounted in said radial air bearing; and
    wherein one of the confronting circumferential surfaces of said thrust air bearing and said rotor shaft has a spiral groove formed therein for forcing air toward the forward end of the thrust air bearing when said rotor shaft rotates, and one of the confronting circumferential surfaces of said radial air bearing and said rotor shaft has at least two spiral grooves formed therein arranged for forcing air towards an intermediate region between said at least two spiral grooves.

2. A fan motor as recited in claim 1, wherein
    said thrust air bearing comprises a cylindrical bearing having a closed forward end.

3. A fan motor, having a forward end and a rearward end, comprising:
    a rotor shaft having a fan fixedly mounted thereto for rotation therewith;

a cylindrical hydrodynamic air bearing having a closed forward end and rotatably mounting a forward end of said rotor shaft, a first spiral groove being formed in one of the confronting circumferential surfaces of said rotor shaft and said air bearing for forcing air toward said forward end of said air bearing when the rotor shaft rotates; and a resilient bearing rotatably mounting a rearward end of said rotor shaft.

4. A fan motor as recited in claim 3, further comprising;

an outer casing; and means for flexibly supporting said hydrodynamic air bearing in said outer casing such that said hydrodynamic air bearing is movable in all directions.

5. A fan motor as recited in claim 4, wherein said flexible supporting means comprises a plurality of flexible support members connected between said hydrodynamic air bearing and said outer casing.

* * * * *